US011664754B2

(12) United States Patent
Nakajima et al.

(10) Patent No.: US 11,664,754 B2
(45) Date of Patent: May 30, 2023

(54) ADJUSTMENT SUPPORT DEVICE, SERVO DRIVER, CONTROL PARAMETERS ADJUSTMENT METHOD FOR PLURALITY OF SERVO MOTORS, AND PROGRAM

(71) Applicant: OMRON Corporation, Kyoto (JP)

(72) Inventors: Kenji Nakajima, Hannan (JP); Yasushi Ono, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 35 days.

(21) Appl. No.: 17/426,786

(22) PCT Filed: Feb. 21, 2020

(86) PCT No.: PCT/JP2020/007148
§ 371 (c)(1),
(2) Date: Jul. 29, 2021

(87) PCT Pub. No.: WO2020/175383
PCT Pub. Date: Sep. 3, 2020

(65) Prior Publication Data
US 2022/0077800 A1 Mar. 10, 2022

(30) Foreign Application Priority Data
Feb. 26, 2019 (JP) .............................. JP2019-033110

(51) Int. Cl.
*H02P 23/14* (2006.01)
*G05B 23/02* (2006.01)
*H02P 5/74* (2006.01)

(52) U.S. Cl.
CPC .......... *H02P 23/14* (2013.01); *G05B 23/0262* (2013.01); *H02P 5/74* (2013.01)

(58) Field of Classification Search
CPC .... H02P 23/14; H02P 5/74; H02P 5/46; H02P 21/0025; G05B 23/0262; G05B 19/056
(Continued)

(56) References Cited

U.S. PATENT DOCUMENTS

| 5,475,291 A | 12/1995 | Yoshida |
| 7,057,366 B1 * | 6/2006 | Tsai ..................... G05B 13/042 318/560 |

(Continued)

FOREIGN PATENT DOCUMENTS

| JP | H06319284 A | 11/1994 |
| JP | 2001352773 A | 12/2001 |

(Continued)

OTHER PUBLICATIONS

International Search Report issued in Intl. Appln. No. PCT/JP2020/007148 dated Apr. 7, 2020. English translation provided.

(Continued)

*Primary Examiner* — David Luo
(74) *Attorney, Agent, or Firm* — Rossi, Kimms & McDowell LLP

(57) ABSTRACT

A technique enables control parameter adjustment with a more accurate estimated inertia ratio for multiple servomotors. An adjustment support apparatus (9) supports adjustment of inertia ratios as control parameters for servo drivers (5, 6) that drive multiple servomotors. The adjustment support apparatus (9) includes an inertia ratio obtainer (91) that obtains inertia ratios estimated by inertia ratio estimators (52, 62) included in the servo drivers (5, 6) and an inertia ratio setting control unit (92) that synchronizes inertia ratio settings and updates between the servo drivers (5, 6).

16 Claims, 13 Drawing Sheets

(58) Field of Classification Search
USPC .......................................... 318/565, 563, 560
See application file for complete search history.

(56) References Cited

U.S. PATENT DOCUMENTS

| | | | | |
|---|---|---|---|---|
| 8,334,669 | B2 * | 12/2012 | Nagato | .............. G05B 19/4141 |
| | | | | 318/560 |
| 10,365,634 | B2 * | 7/2019 | Wakana | ................ G05B 19/409 |
| 2014/0306643 | A1 | 10/2014 | Kaku | |
| 2016/0231730 | A1 | 8/2016 | Wakana | |

FOREIGN PATENT DOCUMENTS

| | | | |
|---|---|---|---|
| JP | 2010178510 | A | 8/2010 |
| JP | 2011022676 | A | 2/2011 |
| WO | 2013099032 | A1 | 7/2013 |
| WO | 2015052844 | A1 | 4/2015 |

OTHER PUBLICATIONS

Written Opinion issued in Intl. Appln. No. PCT/JP2020/007148 dated Apr. 7, 2020. English translation provided.

* cited by examiner

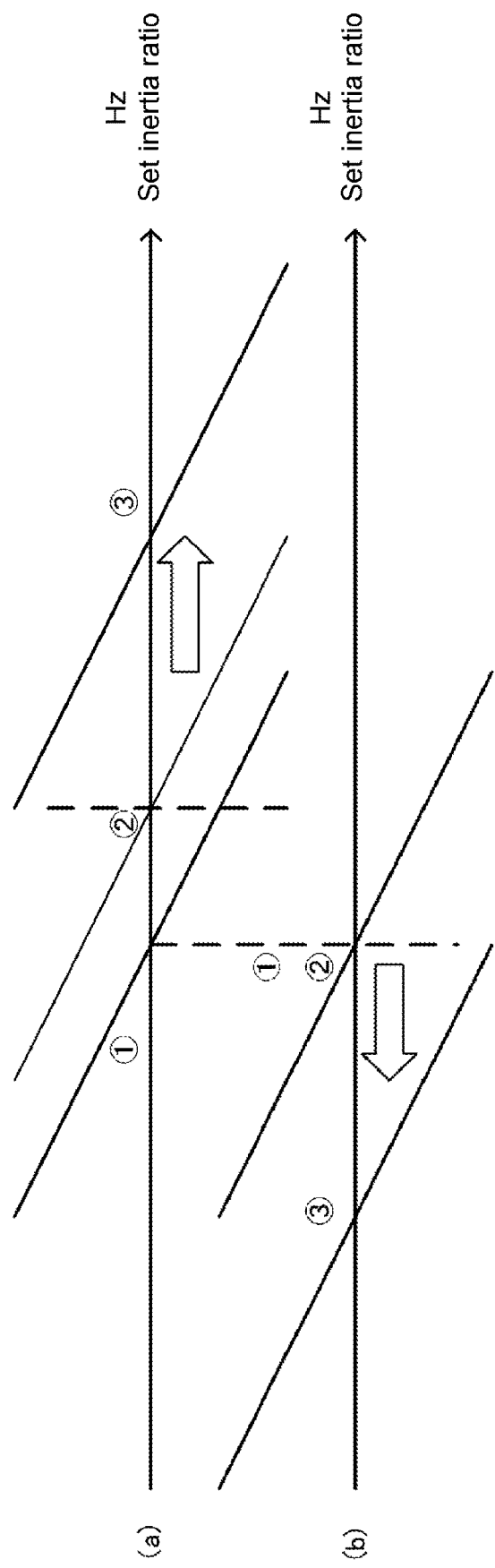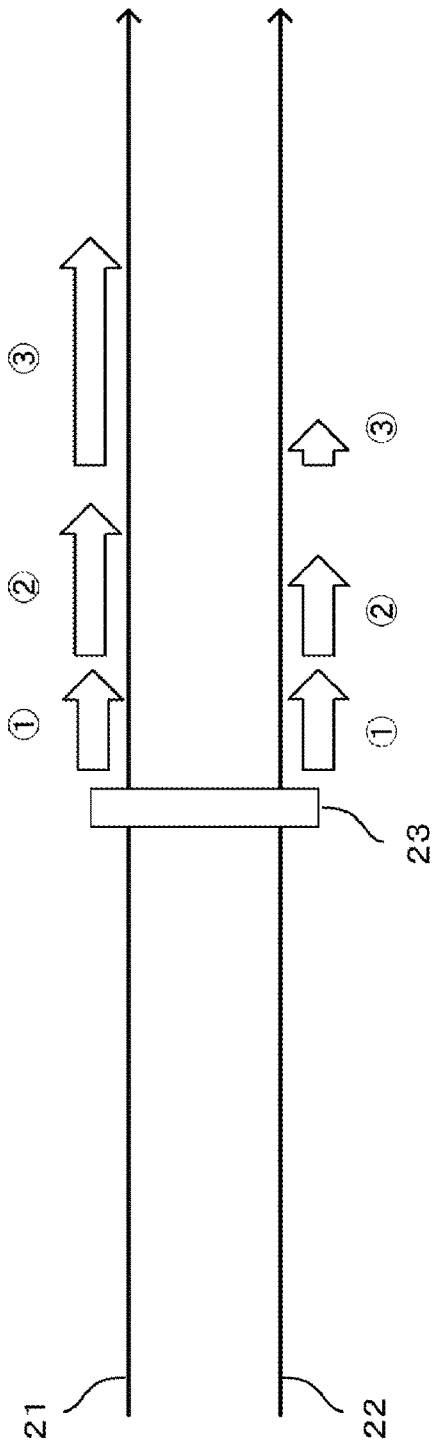
FIG. 3A
FIG. 3B

ADJUSTMENT SUPPORT DEVICE, SERVO DRIVER, CONTROL PARAMETERS ADJUSTMENT METHOD FOR PLURALITY OF SERVO MOTORS, AND PROGRAM

FIELD

The present invention relates to an adjustment support apparatus, a servo driver, a control parameter adjustment method for multiple servomotors, and a program.

BACKGROUND

Control parameters for a known control device that controls multiple servomotors are precalculated and set during the design phase of the control device or adjusted by an operator having experience or knowhow.

In particular, for a control device that controls multiple motors, the control parameters are adjusted for each axis (refer to, for example, Patent Literature 1).

The control parameter adjustment using the above known method may thus take a long time. During the control parameter adjustment for a control device that controls multiple motors, among others, an inertia ratio, which is a control parameter, is difficult to estimate accurately due to possible interference between axes as in a gantry system or a tandem system.

CITATION LIST

Patent Literature

Patent Literature 1: Japanese Unexamined Patent Application Publication No. 2011-22676

SUMMARY

Technical Problem

In response to the above issue, one or more aspects of present invention are directed to a technique for adjusting control parameters with more accurate estimated inertia ratios for multiple servomotors.

Solution to Problem

An adjustment support apparatus according to an aspect of the present invention is an apparatus for supporting adjustment of control parameters for a plurality of servomotors. The apparatus includes a parameter obtainer that obtains a parameter including an estimated inertia ratio for a load drivable by the plurality of servomotors, and a parameter setting controller that allows setting of a parameter including an inertia ratio for controlling the plurality of servomotors. After the parameter obtainer obtains the estimated inertia ratio for each of the plurality of servomotors, the parameter setting controller allows the obtained inertia ratio to be set for each of the plurality of servomotors.

In the adjustment support apparatus according to the aspect, after the parameter obtainer obtains estimated inertia ratios in the plurality of servomotors, the parameter setting controller sets the inertia ratios to the plurality of servomotors, thus enabling inertia ratio settings and updates to be synchronized among the plurality of servomotors. This enables control parameter adjustment with more accurate estimated inertia ratios.

In the adjustment support apparatus, when the inertia ratio for one of the plurality of servomotors is estimated, the parameter setting controller may allow gains and inertia ratios of the other servomotors of the plurality of servomotors to be set at an identical gain and an identical inertia ratio.

This equalizes the responsivities of controlling parts to the servomotors, thus enabling more accurate inertia ratio estimation.

The adjustment support apparatus may further include a validity determination unit that determines validity of the estimated inertia ratio obtained by the parameter obtainer.

In the adjustment support apparatus according to the aspect, with a validity criterion set based on the factors that affect the inertia ratio, the control parameters are adjusted with an estimated inertia ratio satisfying the validity criterion, thus enabling adjustment with a more accurate estimated inertia ratio.

In the adjustment support apparatus, the plurality of servomotors may drive a load including axes with possible axis interference with each other.

For a plurality of servomotors that drive a load including axes with possible axis interference with each other, the axis along which one servomotor drives may serve as a load on another servomotor, increasing the difficulty of accurate inertia ratio estimation. In this case as well, control parameter adjustment is performed with an accurate inertia ratio.

A servo driver according to another aspect of the present invention is a servo driver for controlling a servomotor included in a plurality of servomotors. The servo driver includes a control unit that controls the servomotor, a parameter estimator that estimates a parameter including an inertia ratio for a load drivable by the servomotor, and a setting synchronization that synchronizes setting of the estimated parameter in the control unit with setting of an estimated parameter in a control unit included in a servo driver for controlling another servomotor included in the plurality of servomotors.

The synchronization of inertia ratio settings among the servo drivers enables control parameter adjustment with a more accurate estimated inertia ratio for each servomotor.

In the servo driver, the plurality of servomotors may drive a load including axes with possible axis interference with each other.

For a plurality of servomotors that drive a load including axes with possible axis interference with each other, the axis along which one servomotor drives may serve as a load on another servomotor, increasing the difficulty of accurate inertia ratio estimation. In this case as well, the synchronization of estimated inertia ratio settings among the servo drivers enables control parameter adjustment with accurate inertia ratios.

A control parameter adjustment method for a plurality of servomotors according to another aspect of the present invention includes obtaining, for each of the plurality of servomotors, a control parameter including an estimated inertia ratio for a load drivable by the plurality of servomotors, and setting the obtained control parameter as a control parameter for controlling each of the plurality of servomotors.

The control parameter adjustment method may further include, when the inertia ratio for one of the plurality of servomotors is estimated, setting gains and inertia ratios of the other servomotors of the plurality of servomotors at an identical gain and an identical inertia ratio.

The control parameter adjustment method may further include determining whether the control parameter obtained from each of the plurality of servomotors is valid. The control parameter determined to be valid may be set as a control parameter for controlling each of the plurality of servomotors.

In the control parameter adjustment method, the plurality of servomotors may drive a load including axes with possible axis interference with each other.

A control parameter adjustment method for a plurality of servomotors according to another aspect of the present invention includes estimating, with each of the plurality of servomotors, a control parameter including an inertia ratio for a load drivable by the plurality of servomotors, and setting, with each of the plurality of servomotors, the estimated control parameter as a control parameter for controlling each of the plurality of servomotors after all the servomotors of the plurality of servomotors perform the control parameter estimation.

In the control parameter adjustment method, the plurality of servomotors may drive a load including axes with possible axis interference with each other.

A program for adjusting control parameters for a plurality of servomotors according to another aspect of the present invention causes a computer to perform operations including obtaining, for each of the plurality of servomotors, a control parameter including an estimated inertia ratio for a load drivable by the plurality of servomotors, and setting the obtained control parameter as a control parameter for controlling each of the plurality of servomotors.

A program for adjusting control parameters for a plurality of servomotors according to another aspect of the present invention causes a computer to perform operations including estimating, with each of the plurality of servomotors, a control parameter including an inertia ratio for a load drivable by the plurality of servomotors, and setting, with each of the plurality of servomotors, the estimated control parameter as a control parameter for controlling each of the plurality of servomotors after all the servomotors of the plurality of servomotors perform the control parameter estimation.

Advantageous Effects

The technique according to the above aspects of the present invention enable control parameter adjustment with more accurate estimated inertia ratios for multiple servomotors.

BRIEF DESCRIPTION OF THE DRAWINGS

FIGS. 3A and 3B are diagrams describing the principle of inaccurate inertia ratio estimation.

DETAILED DESCRIPTION

Example Use

Figure 1:
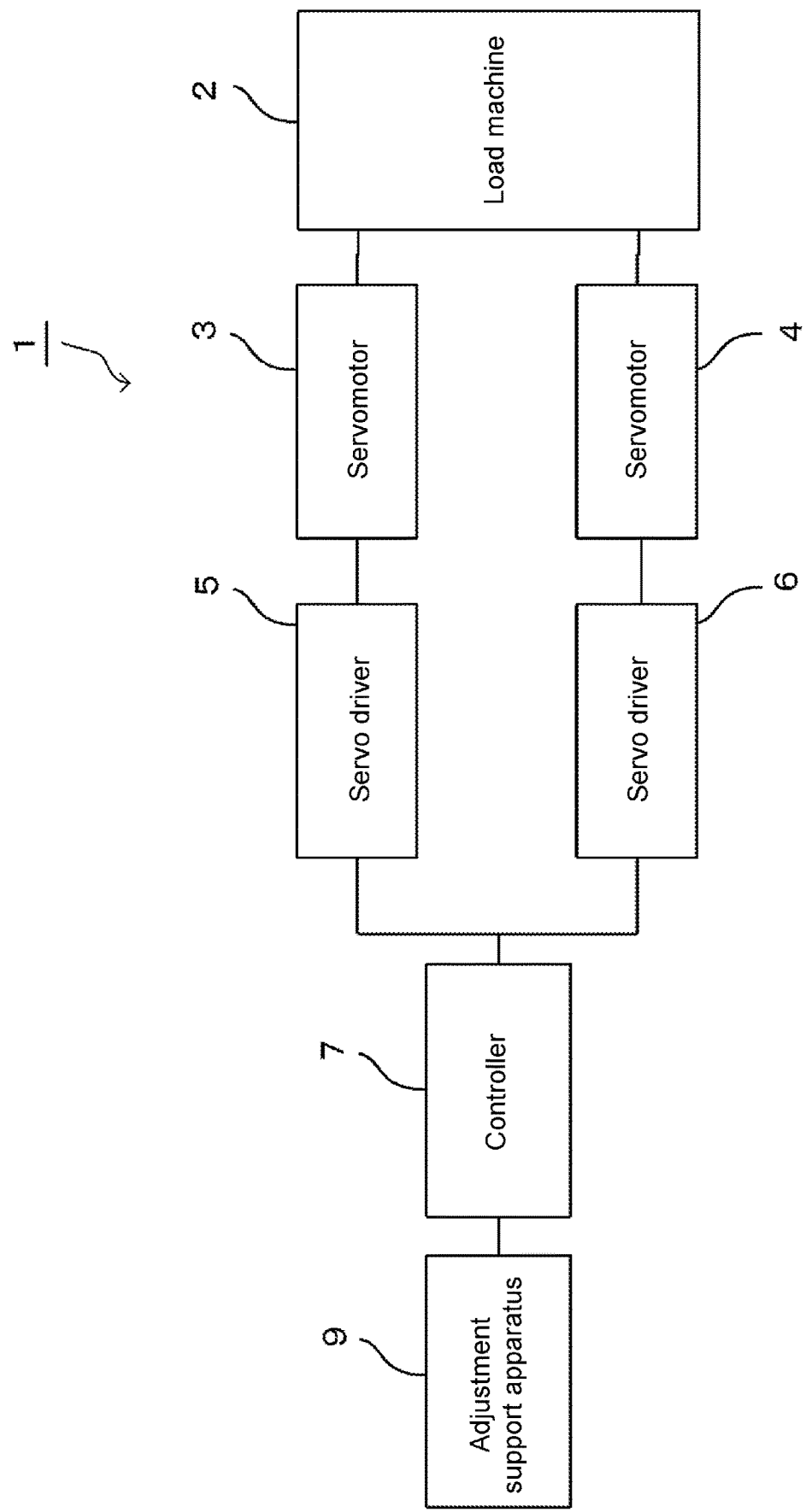
FIG. 1 is a schematic block diagram of a control system according to a first embodiment.

Example uses of the present invention will now be described with reference to the drawings. The present invention is applicable to, for example, an adjustment support apparatus 9 shown in FIG. 1. FIG. 1 shows a control system 1 that controls servomotors 3 and 4 for driving a load machine 2. The control system 1 includes the adjustment support apparatus 9, a controller 7, servo drivers 5 and 6, the servomotors 3 and 4, and the load machine 2. The load machine 2 has a multi-axis system driven by the servomotors 3 and 4.

Figure 2:
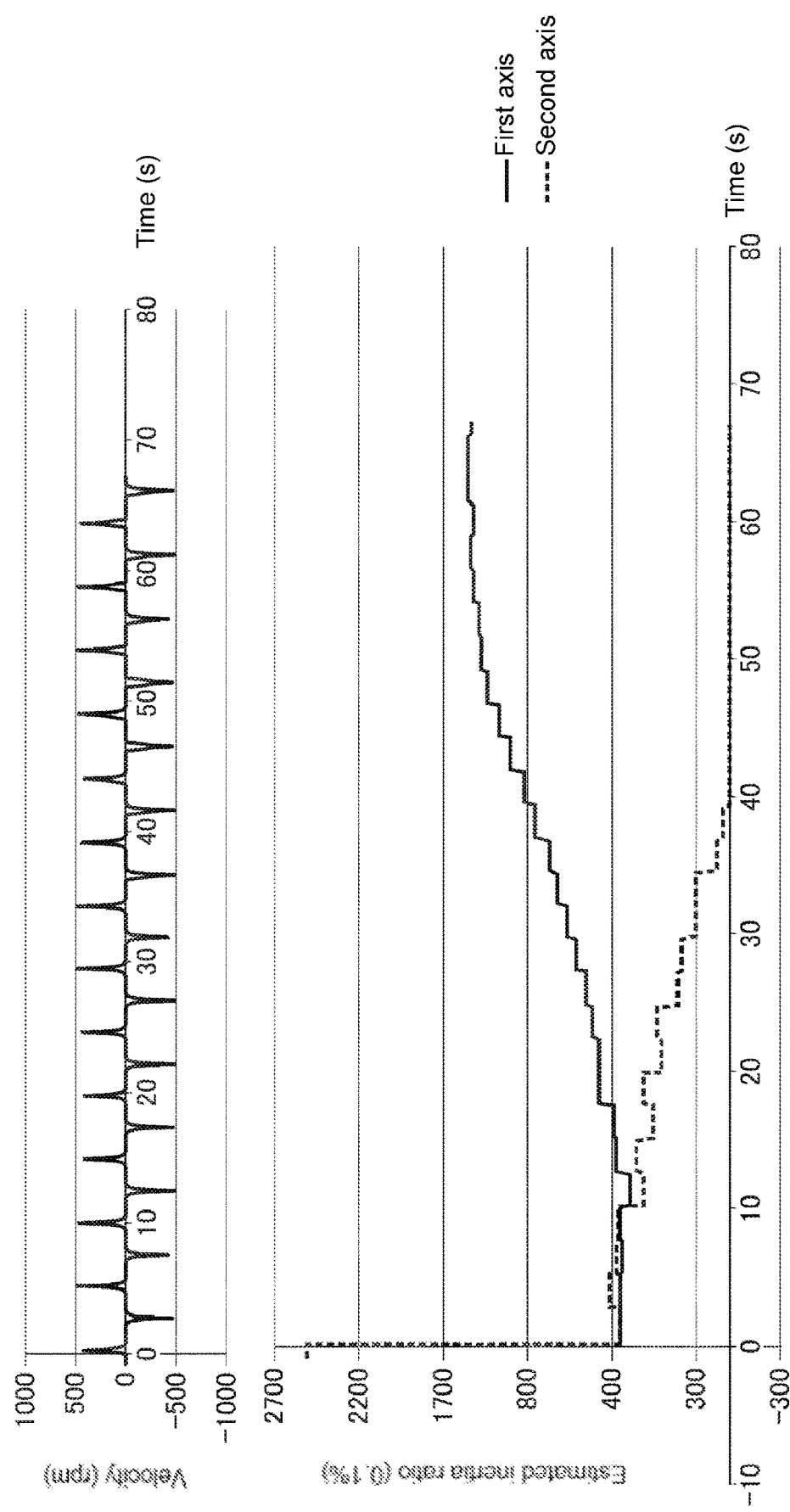
FIG. 2 is a graph showing an example of inaccurate inertia ratio estimation.

During control parameter adjustment for a control system that includes a load machine having a multi-axis system, the inertia ratio for each axis is estimated. The inertia ratio is estimated for each axis by an inertia ratio estimator included in a servo driver. However, a load machine including a gantry system or a tandem system as a multi-axis system may have interference between axes along which the load machine is driven by multiple servomotors. Multiple servomotors may drive components having rigid mechanical coupling between them. In this case, when the load machine is operated, a first axis may serve as a load on a second axis, causing the inertia ratio on the first axis to be estimated to be large. FIG. 2 shows an example of such inaccurate inertia ratio estimation. The upper part of FIG. 2 shows the rotational speed of the servomotors 3 and 4 performing a trial operation of the load machine 2 for inertia ratio estimation (for the schematic configuration of the load machine 2, refer to FIG. 3B). The lower part of FIG. 2 shows the inertia ratios for a first axis 21 and a second axis 22 estimated during the operation of the load machine 2 in the upper part. The first axis 21 indicated by a solid line leads, and the second axis 22 indicated by a dashed line is pulled, with the second axis 22 acting on the first axis 21 like a load. In this state, the estimated inertia ratio for the first axis 21 increases, and the estimated inertia ratio for the second axis 22 decreases to 0. This causes inaccurate estimation of the inertia ratios for the first axis 21 and the second axis 22.

The principle of the above phenomenon will be described with reference to FIGS. 3A and 3B. In FIG. 3A, line (a) schematically indicates the estimated inertia ratio and the control band for the first axis 21, and line (b) schematically indicates the estimated inertia ratio and the control band for the second axis 22. FIG. 3B schematically shows a gantry system in the load machine 2. The gantry system has a machine element 23 mechanically connected at right angles to the first axis 21 and the second axis 22 arranged in parallel. In FIG. 3B, the magnitudes of torque on the first axis 21 and the second axis during operation are indicated by the lengths of arrows. As shown in FIG. 3A, the first axis 21 and the second axis have the same estimated inertia ratio in the state indicated by circled number 1. In this state, for a load machine with high rigidity (or with an equal load for each axis), when the first axis 21 and the second axis have an equal velocity proportional gain, the first axis 21 and the second axis also have an equal control band. Thus, as shown in FIG. 3B, the first axis 21 and the second axis have the same torque. As the state shifts from circled number 1 to circled number 2, and from circled number 2 to circled number 3, the estimated inertia ratio for the first axis 21 increases (the position of intersection of the first axis 21 with an oblique line in FIG. 3A indicates the estimated inertia ratio for the first axis 21). In contrast, the estimated inertia ratio for the second axis decreases (the position of intersection of the second axis with an oblique line in FIG. 3A indicates the estimated inertia ratio for the second axis). When the inertia ratio for the first axis 21 increases with decreasing inertia ratio for the second axis, the apparent control band of the second axis is lower than that of the first axis 21. Thus, as indicated by circled number 2 and circled number 3 in FIG. 3B, the torque on the first axis 21 increases to further increase the velocity. In contrast, the torque on the second axis decreases, and almost no torque is generated in the state indicated by circled number 3.

Figure 4:
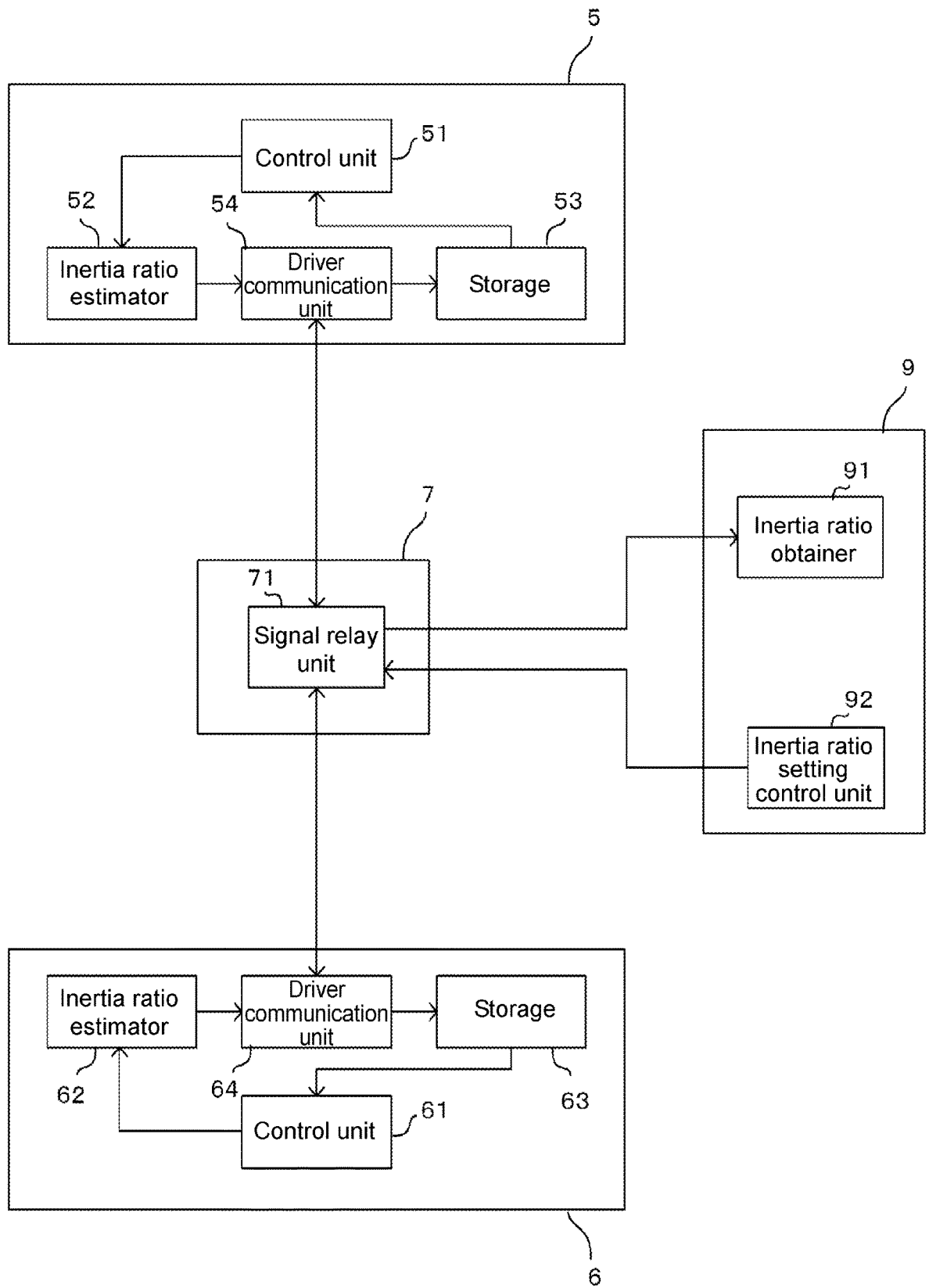
FIG. 4 is a schematic block diagram of servo drivers and an adjustment support apparatus according to the first embodiment.

To avoid inaccurate inertia ratio estimation that occurs when the inertia ratio is estimated and updated in the servo driver for each of the axes with possible axis interference, the control system 1 includes the adjustment support apparatus 9 that supports inertia ratio adjustments for the axes with possible axis interference. The adjustment support apparatus 9, as shown in FIG. 4, transmits and receives signals to and from the servo drivers 5 and 6 through a signal relay unit 71 in the controller 7. The adjustment support apparatus 9 obtains estimated inertia ratios from the servo drivers 5 and 6 corresponding to axes with possible axis interference through respective driver communication units 54 and 64. An inertia ratio setting control unit 92 then provides the estimated inertia ratios to the servo drivers 5 and 6 for inertia ratios to be updated at the same time. The servo drivers 5 and 6 store the estimated inertia ratios received from the inertia ratio setting control unit 92 through the driver communication units 54 and 64 into storages 53 and 63. Based on the stored estimated inertia ratios, control units 51 and 61 update set inertia ratios.

The adjustment support apparatus 9 synchronizes inertia ratio settings in this manner, enabling accurate inertia ratio estimation for the load machine 2 with possible axis interference.

The adjustment support apparatus 9 may be a personal computer or a programmable logic controller (PLC) that executes a predetermined program. The adjustment support apparatus 9 may not be separate from the servo drivers 5 and 6 and the controller 7. The adjustment support apparatus 9 may be included in a controller that controls both the servo drivers 5 and 6 corresponding to axes with possible axis interference. The servo drivers 5 and 6 corresponding to axes with possible axis interference may share the functions of the adjustment support apparatus 9. In this case, the servo drivers 5 and 6 may communicate with each other to synchronize inertia ratio updates.

First Embodiment

The adjustment support apparatus 9 according to one embodiment of the present invention will now be described in more detail with reference to the drawings.

Apparatus Configuration

FIG. 1 is a schematic block diagram of the control system 1 including the adjustment support apparatus 9 according to the present embodiment. The load machine 2 includes a multi-axis system having multiple axes with possible axis interference, such as a gantry system or a tandem system. The servomotors 3 and 4 drive along axes with possible axis interference with each other. The load machine 2 has the structure, for example, schematically shown in FIG. 3B. The servomotor 3 drives along the first axis 21, and the servomotor 4 drives along the second axis. The servomotors 3 and 4 are connected to the respective servo drivers 5 and 6 that output drive signals for the servomotors 3 and 4 in accordance with command signals. The servo drivers 5 and 6 are connected to the controller 78 that outputs the command signals in accordance with input by a user or from an external device. Additionally, the adjustment support apparatus 9 is installed to support inertia ratio adjustments performed by the servo drivers 5 and 6. Although the configuration shown in FIG. 1 has two axes with possible axis interference, a load machine having three or more axes with possible axis interference also includes servomotors, servo drivers, and a controller for the axes, with each servo driver connected to the adjustment support apparatus 9.

FIG. 4 is a schematic block diagram of the servo drivers 5 and 6, the controller 7, and the adjustment support apparatus 9.

The servo drivers 5 and 6 include the control units 51 and 61 that output driving currents to the servomotors 3 and 4 based on commands received from the controller 7. The control units 51 and 61 include a position controller, a velocity controller, and a torque controller, which may be known appropriate controllers and will not be described in detail. The servo driver 5 includes an inertia ratio estimator 52 that estimates an inertia ratio. The controller 7 includes the signal relay unit 71 that relays signals between the servo drivers 5 and 6 and the adjustment support apparatus 9. The controller 7 includes a memory unit, a communication unit, and a processor that is a central processing unit (CPU) for executing numerical control programs, which may be known appropriate units and will not be described in detail. The adjustment support apparatus 9 is, for example, a computer including a CPU that executes an inertia ratio adjusting program described later and a storage device that stores the program and data. The servo driver 5 also includes a storage 53 that stores control programs and data such as various control parameters including an inertia ratio used to control the servomotor 3. The servo driver 5 further includes a driver communication unit 54 that communicates with the outside. The servo driver 6 also includes a control unit 61, an inertia ratio estimator 62, a storage 63, and a driver communication unit 64. Each unit is the same as in the servo driver and will not be described.

The adjustment support apparatus 9 includes an inertia ratio obtainer 91 that obtains inertia ratios estimated in the inertia ratio estimators 52 and 62 from the servo drivers 5 and 6 through the driver communication units 54 and 64 and the signal relay unit 71, and the inertia ratio setting control unit 92 that provides the obtained inertia ratios to the corresponding servo drivers 5 and 6 through the signal relay unit 71. The inertia ratio obtainer 91 corresponds to a parameter obtainer, and the inertia ratio setting control unit corresponds to a parameter setting controller.

In the servo drivers 5 and 6, the inertia ratios received from the inertia ratio setting control unit 92 through the signal relay unit 71 and the driver communication units 54 and 64 are stored into the storages 53 and 63 and used for inertia ratio updates in the control units 51 and 61.

Inertia Ratio Adjustment Method

Figure 5:
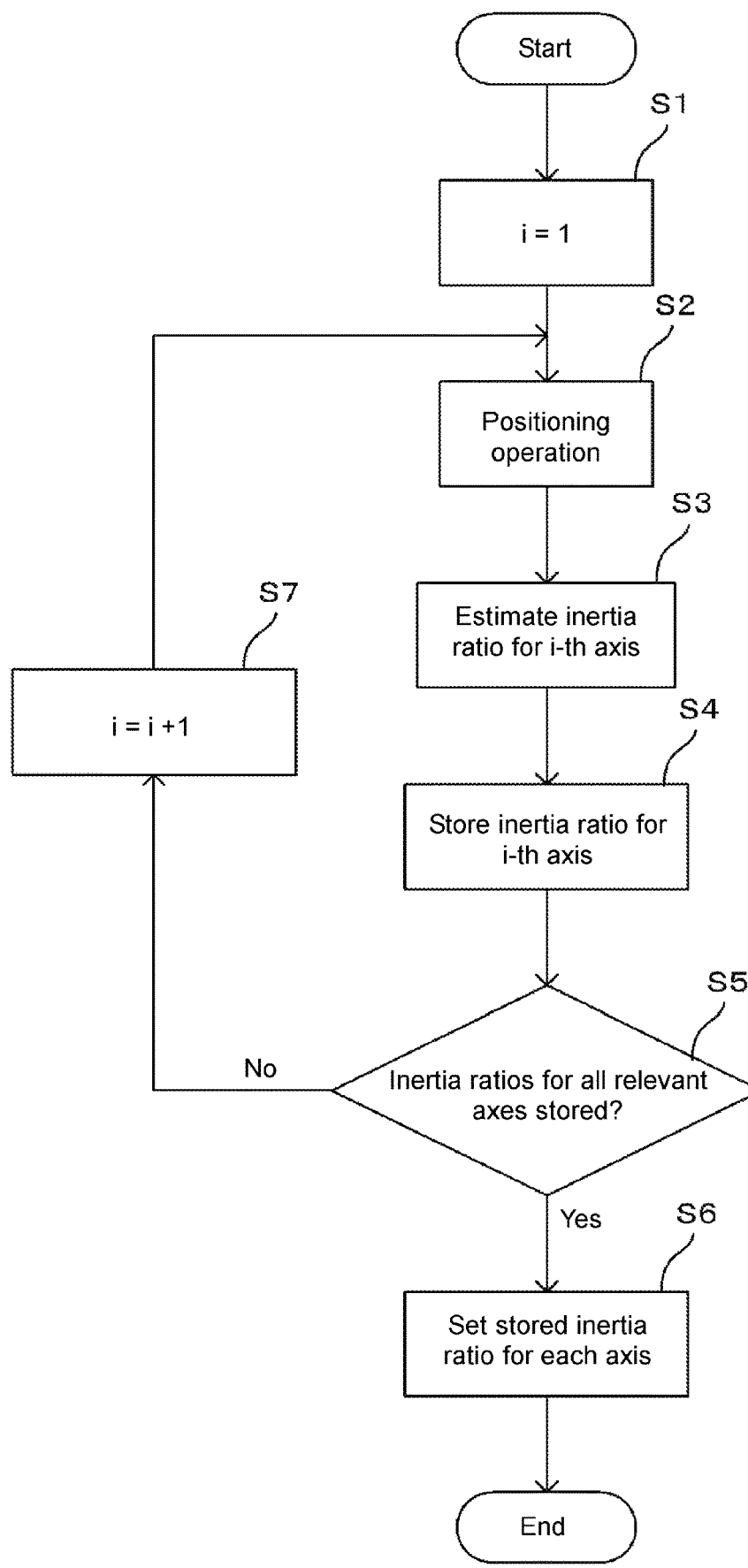
FIG. 5 is a flowchart of a process up to updating inertia ratios in the first embodiment.

FIG. 5 is a flowchart of a process up to updating inertia ratios performed by the servo drivers 5 and 6 and the adjustment support apparatus 9 as an inertia ratio adjustment method.

A variable i that identifies an axis to undergo inertia ratio estimation is first set at 1 (step S1). In this process, axes to undergo inertia ratio estimation, or multiple axes with possible axis interference with each other, are uniquely numbered in ascending order starting from 1 to identify the axes. The i-th axis indicates each identified axis.

The load machine 2 then performs a trial positioning operation involving the multiple axes with possible axis interference (step S2). The inertia ratio for the first axis 21 is then estimated (step S3). The estimated inertia ratio for the first axis 21 is provided to the adjustment support apparatus 9 through the driver communication units 54 and 64, and stored into a predetermined storage area in the inertia ratio obtainer 91 (step S4).

In the adjustment support apparatus 9, an inertia ratio setting unit determines whether the inertia ratios for all the relevant axes, or the multiple axes with possible axis interference with each other (corresponding to the first axis 21 and the second axis 22 in the example in FIG. 3B), are stored (step S5).

When the determination result is affirmative in step S5, the inertia ratio setting unit reads the estimated inertia ratios for the axes from the inertia ratio obtainer 91 and provides the ratios to the servo drivers 5 and 6 corresponding to the axes. The servo drivers 5 and 6 store the estimated inertia ratios received through the driver communication units 54 and 64 into the storages 53 and 63, set these ratios as inertia ratios used for update by the control units 51 and 61, and end the entire process.

When the determination result is negative in step S5, variable i is incremented (step S7), and the processing in steps S2 to S4 is repeated for the next axis (the second axis in this process). When the multiple axes with possible axis interference are two axes, the determination result in step S5 is affirmative, and the processing advances to step S6.

In this manner, the control system 1 that drives and controls the load machine 2 with possible axis interference enables accurate inertia ratio estimation during control parameter adjustment in accordance with the state of each axis.

Second Embodiment

A control system 1 including an adjustment support apparatus 9 according to the present embodiment has the same configuration as in the first embodiment. The same components as in the first embodiment are given the same reference numerals and will not be described.

Figure 6:
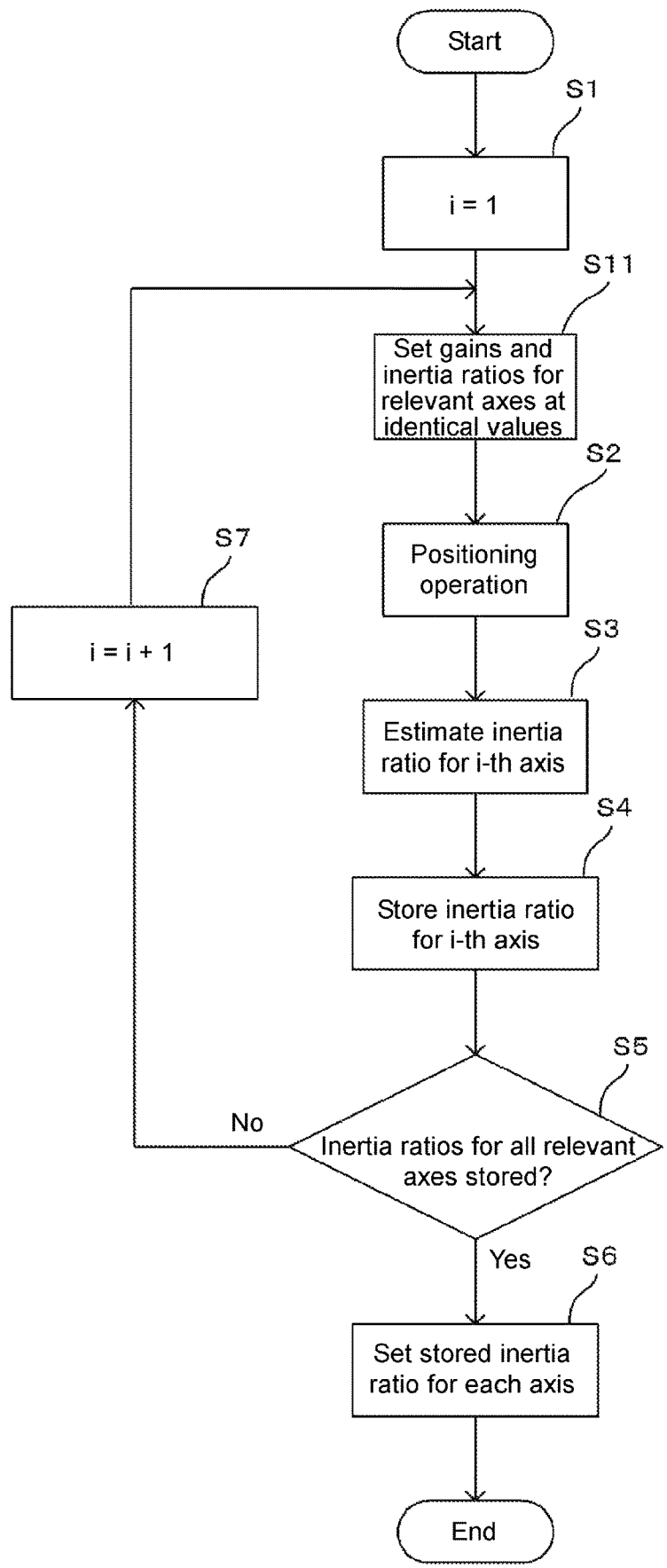
FIG. 6 is a flowchart of a process up to updating inertia ratios in a second embodiment.

FIG. 6 is a flowchart of a process up to updating inertia ratios performed by the servo drivers 5 and 6 and the adjustment support apparatus 9 according to the present embodiment. In the present embodiment, when the inertia ratio for each of the axes with possible axis interference is estimated, the gains and the inertia ratios for the relevant axes are set at the same values (step S11). After the setting, the load machine 2 performs a positioning operation (step S2) involving the multiple axes with possible axis interference and the subsequent processing. Step S2 and subsequent steps are the same as in the first embodiment and will not be described repeatedly. Until the completion of the inertia ratio estimation for the axis undergoing the inertia ratio estimation, the other relevant axes remain at the gain and the inertia ratio set in step S11.

Inertia ratio estimation with different axis control responsivities of relevant axes may not be accurately performed because an axis has a higher responsivity and outputs high torque during an operation. However, as described above, setting the gains and the inertia ratios for the relevant axes at the same values during inertia estimation equalizes the responsivities of controlling parts in axis control on the relevant axes, thus enabling accurate inertia ratio estimation.

In the present embodiment in which the controlling parts in axis control have the same responsivity among the relevant axes, different actual loads driven by different motors cause different responses in the load machine 2. However, when the relevant axis control is position control, the torque to be output corresponds to the excess load. This enables accurate inertia ratio estimation with different actual loads assigned to the relevant axes.

Third Embodiment

Figure 7:
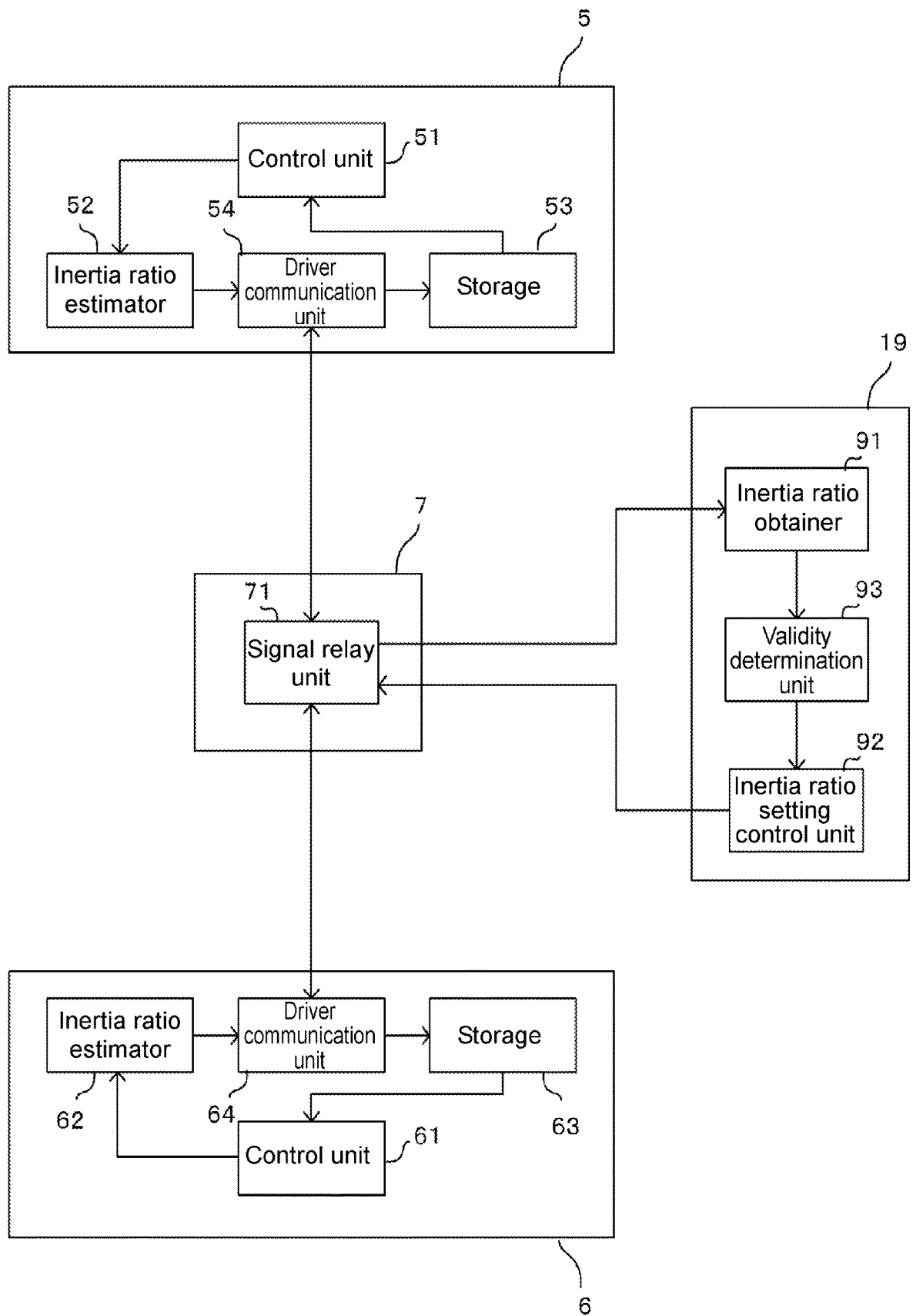
FIG. 7 is a schematic block diagram of servo drivers and an adjustment support apparatus according to a third embodiment.

FIG. 7 is a schematic block diagram of an adjustment support apparatus and servo drivers according to the present embodiment. The same components as in the first and second embodiments are given the same reference numerals and will not be described.

In the present embodiment, an adjustment support apparatus 19 includes a validity determination unit 93 in addition to an inertia ratio obtainer 91 and an inertia ratio setting control unit 92. The validity determination unit 93 determines whether inertia ratios obtained from the servo drivers 5 and 6 are valid. When the load machine 2 performs a trial positioning operation for inertia ratio estimation, the operation may have slow acceleration. In this case, the torque during the operation is likely to depend on friction, rather than on an inertia ratio.

An example method for determining whether an estimated inertia ratio is valid will now be described. In inertia ratio estimation, the kinetic friction, the viscous friction, and the unbalanced load are also often estimated. These parameters are thus used as a determination value: (unbalanced load+kinetic friction+viscous friction)/inertia ratio. In an area in which the positioning operation of the load machine 2 has slow acceleration, the inertia ratio is estimated as friction, and the inertia ratio is small although the determination value is large. In an area in which the positioning operation of the load machine 2 has fast acceleration, the estimated inertia ratio is substantially constant, and the determination value decreases. Based on such characteristics of the determination value, an inertia ratio validity criterion is determined. For a determination value greater than or equal to 1, the inertia ratio is determined to be invalid. For a determination value less than 1, the inertia ratio is determined to be valid. This is one example validity criterion for an estimated inertia ratio, and the validity of an estimated inertia ratio may be determined by other criteria.

Inertia Ratio Adjustment Method

Figure 8:
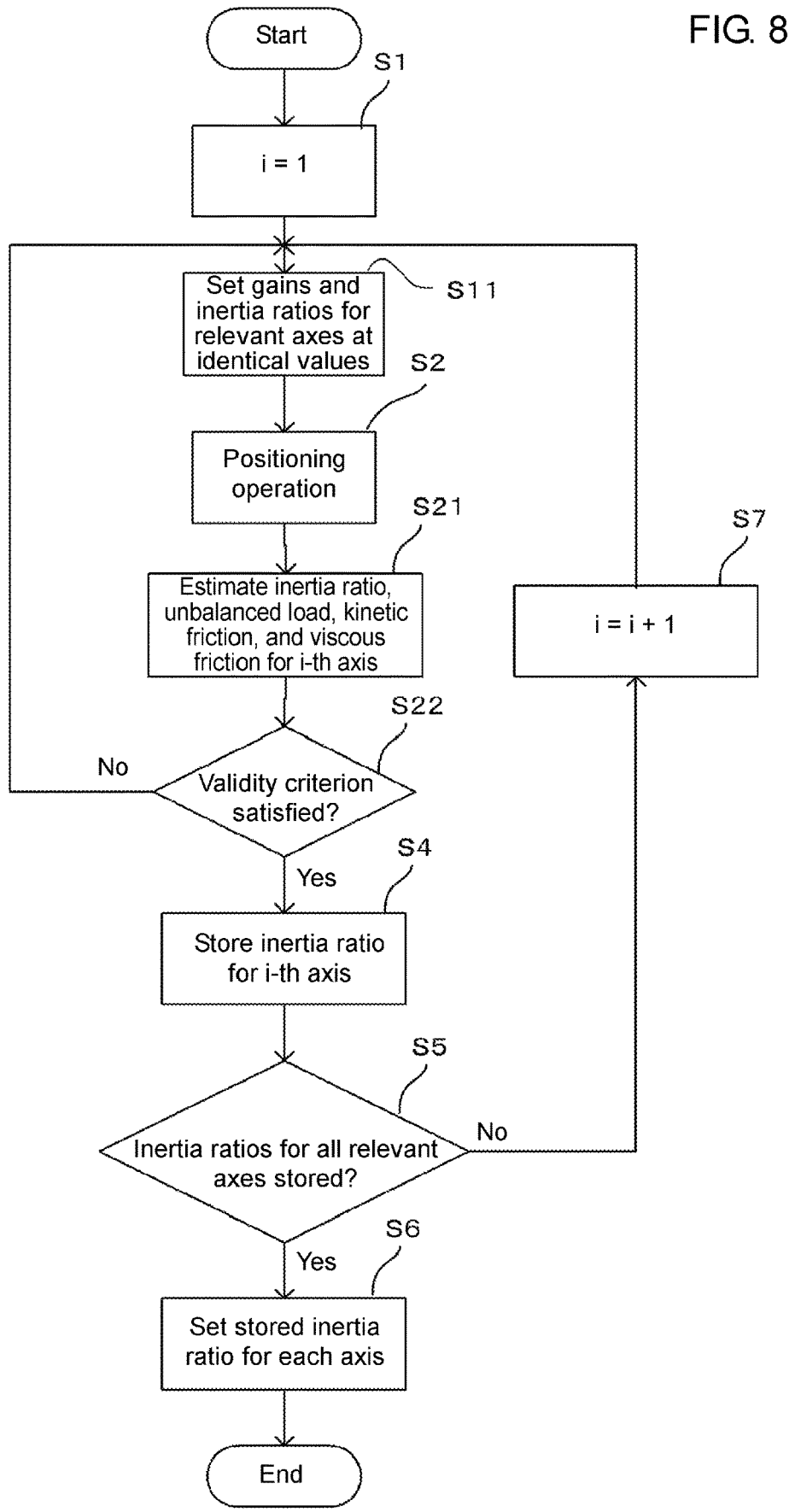
FIG. 8 is a flowchart of a process up to updating inertia ratios in the third embodiment.

FIG. 8 is a flowchart of a process up to updating inertia ratios performed by the servo drivers 5 and 6 and the adjustment support apparatus 19 as an inertia ratio adjustment method according to the present embodiment. In the present embodiment, a trial positioning operation is performed (step S2), and in addition to estimation of the inertia ratio of the i-th axis, the unbalanced load, the kinetic friction, and the viscous friction are estimated (step S21). In step S21, the inertia ratio obtainer 91 obtains these estimated values from the servo drivers 5 and 6 through the driver communication units 54 and 64, and the validity determination unit 93 calculates a determination value from these estimated values and determines whether the validity criterion is satisfied (step S22).

In step S22, in response to a determination that the validity criterion is satisfied, or the determination value is less than 1, the processing advances to step S4.

In step S22, in response to a determination that the validity criterion is not satisfied, or the determination value is greater than or equal to 1, the processing returns to step S11. In the processing in step S11 and subsequent steps, an inertia setting control unit causes the servo drivers 5 and 6 to estimate the inertia ratios with higher acceleration of the positioning operation. The inertia setting control unit may display a message prompting the user to increase the acceleration of the positioning operation.

The validity of the estimated inertia ratio is determined in this manner, enabling more accurate inertia ratio estimation.

Fourth Embodiment

Apparatus Configuration

Figure 9:
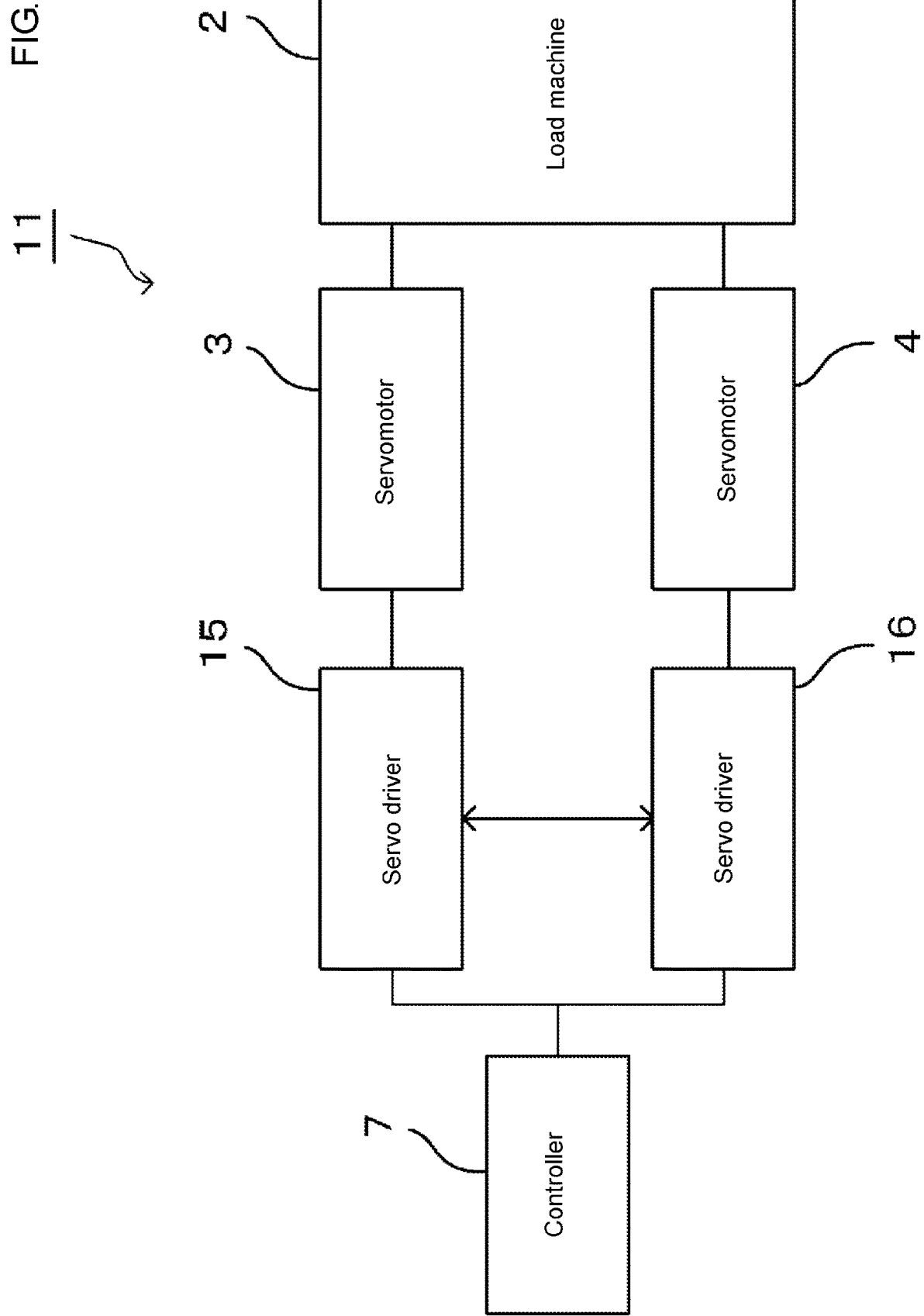
FIG. 9 is a schematic block diagram of a control system according to a fourth embodiment.
Figure 10:
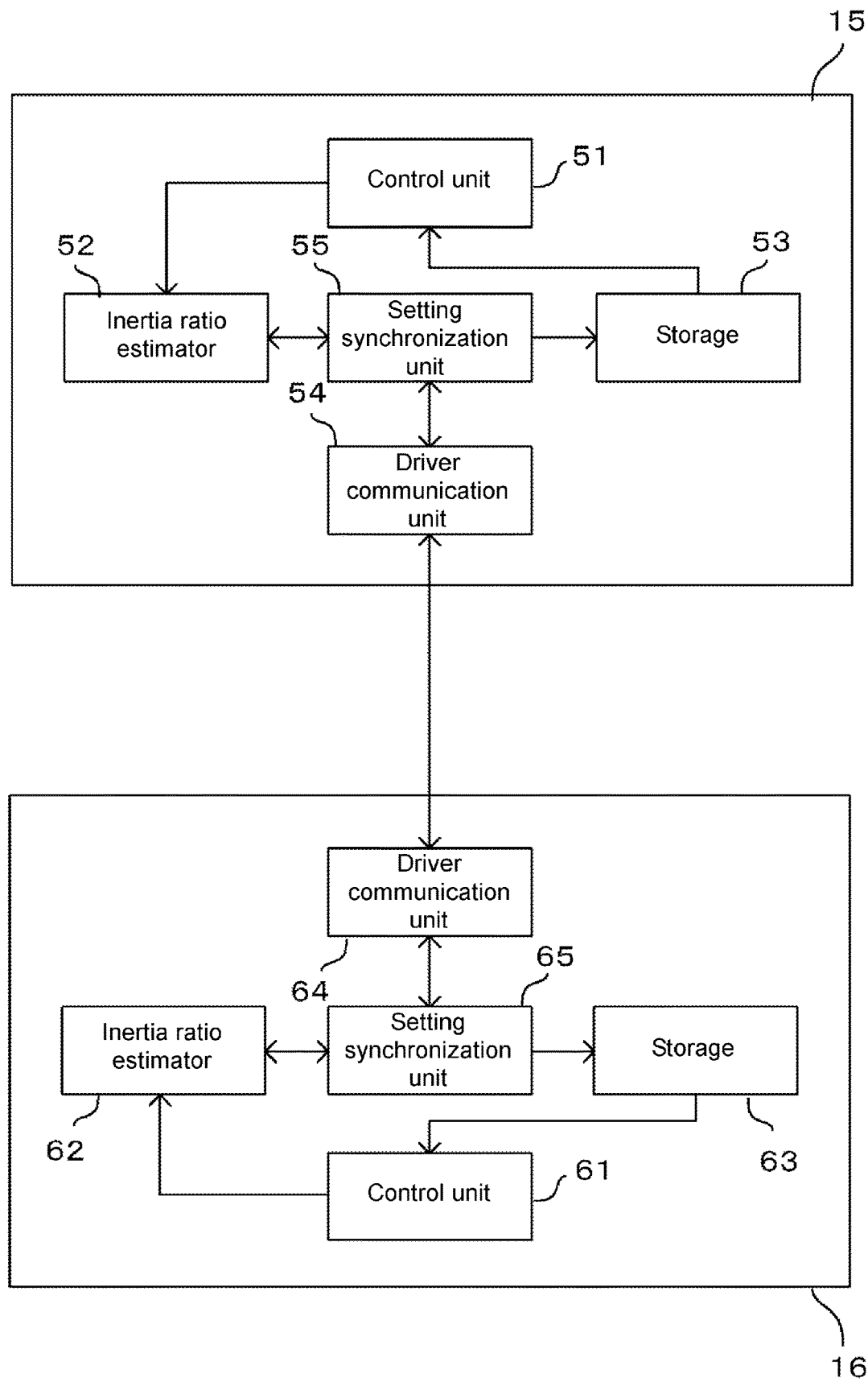
FIG. 10 is a schematic block diagram of servo drivers according to the fourth embodiment.
Figure 11:
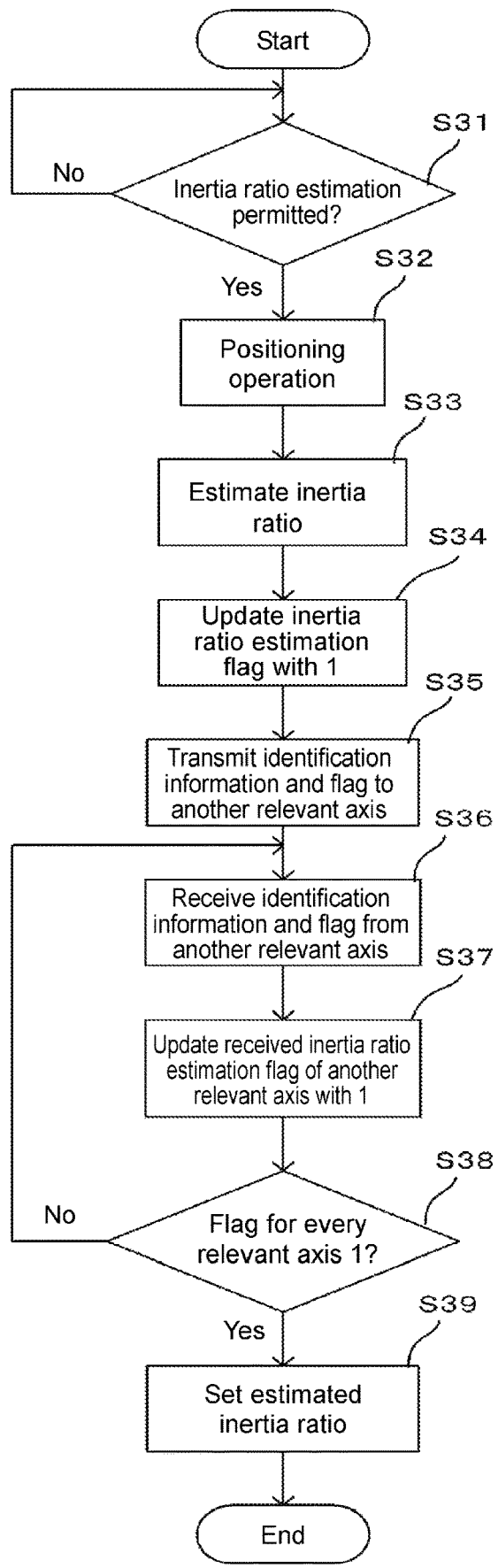
FIG. 11 is a flowchart of a setting synchronization process for estimated inertia ratios in the fourth embodiment.

FIG. 9 is a schematic block diagram of a control system 11 according to the present embodiment. The structure according to the present embodiment eliminates the adjustment control apparatus in the control system 1 according to the first embodiment, and differs from the first embodiment in the servo driver configuration. The same components as in the first embodiment are given the same reference numerals and will not be described. FIG. 10 is a schematic block diagram of servo drivers 15 and 16 according to the present embodiment. FIG. 11 is a flowchart of a setting synchronization process for estimated inertia ratios in the servo drivers 15 and 16. In the present embodiment, the servo drivers correspond to a computer that executes a program for adjusting inertia ratios.

The servo drivers 15 and 16 respectively include setting synchronization units 55 and 65 in addition to control units 51 and 61, inertia estimators, storages 53 and 63, and driver communication units 54 and 64. Axes with possible axis interference with each other, or multiple axes included in relevant axes, each have an inertia ratio estimation table in which identification information identifying each axis included in the relevant axes is linked with an inertia ratio estimation flag that is information about inertia ratio estimation for the axis. With none of the relevant axes undergoing inertia ratio estimation, the inertia ratio estimation flag is set at 0. The axes included in the relevant axes undergo inertia ratio estimation in a predefined order.

With reference to FIG. 11, the setting synchronization process for estimated inertia ratios in the servo drivers 15 and 16 will now be described as an inertia ratio adjustment method according to the present embodiment.

The setting synchronization units 55 and 65 first determine whether inertia ratio estimation is permitted (step S31). More specifically, each setting synchronization unit determines whether the turn of its axis has come for inertia ratio estimation. Of the axes included in the relevant axes, when the first axis 21 is the first axis to undergo inertia ratio estimation, the determination result in step S31 is affirmative independently of the state of any other axis included in the relevant axes. In this case, the load machine 2 performs a trial positioning operation involving the relevant axes (step S32). The inertia estimators in the servo drivers 15 and 16 for the first axis 21 estimates the inertia ratio (step S33).

Upon completion of the inertia ratio estimation for the first axis 21, the setting synchronization unit 55 updates the inertia ratio estimation flag of the first axis 21 in its inertia ratio estimation table with 1 (step S34). The setting synchronization unit 55 then transmits the identification information about the first axis 21 and the inertia ratio estimation flag of 1 to another axis included in the relevant axes, for example, the servo driver 16 for the second axis through the driver communication unit 54 (step S35).

Upon receiving this information from the first axis 21, the setting synchronization unit 65 in the servo driver 16 for the second axis updates the inertia ratio estimation flag of the first axis 21 with 1. When the previous axis to undergo inertia ratio estimation in accordance with the predefined order has an inertia ratio estimation flag of 0, the setting synchronization unit 65 in the servo driver 16 for the next axis included in the relevant axes to undergo inertia ratio estimation, or the second axis in the present embodiment, does not estimate the inertia ratio. More specifically, inertia ratio estimation for the second axis is not permitted, and the determination result in step S31 is negative. The setting synchronization unit 65 waits for permission to estimate the inertia ratio. In this example, the inertia ratio estimation flag of the first axis 21, which previously undergoes inertia ratio estimation, has been updated with 1 in the inertia ratio estimation table of the servo driver 16 for the second axis, and the determination result in step S31 is affirmative. Thus, the setting synchronization unit 65 in the servo driver 16 for the second axis causes the inertia ratio estimator 62 to estimate the inertia ratio (step S32). Upon completion of the inertia ratio estimation for the second axis, the inertia ratio estimation flag in the inertia ratio estimation table is updated similarly with 1 (step S34), and the identification information about the second axis and the inertia ratio estimation flag of 1 are transmitted to the other axes included in the relevant axes (step S35).

Returning to the processing for the first axis 21, for the first axis 21, the setting synchronization unit 55 receives the identification information and the inertia ratio estimation flag from the second axis, which is another axis included in the relevant axes, through the driver communication unit 54 (step S36). The inertia ratio estimation flag of the second axis in the inertia ratio estimation table is then updated with 1 (step S37). In this manner, the axes included in the relevant axes sequentially undergo inertia ratio estimation.

The setting synchronization units 55 and 56 then wait for the completion of inertia ratio estimation for the final axis to undergo inertia ratio estimation in accordance with the predefined order and the update of the inertia ratio estimation flag of every axis included in the relevant axes in the inertia ratio estimation table with 1 (step S38). When the inertia ratio estimation flag of every axis included in the relevant axes is 1, the setting synchronization units 55 and 56 in the servo drivers 15 and 16 for the corresponding axes store the estimated inertia ratios of their axes into the storages 53 and 63 and update the inertia ratios (step S39).

This allows multiple axes with possible axis interference to undergo synchronized inertia ratio estimation, enabling accurate inertia ratio estimation.

In the present embodiment, two axes may cause axis interference. However, three or more axes may cause axis interference. Also in this case, the servo drivers are synchronized through the driver communication units.

Also in the present embodiment, when an inertia ratio is estimated, the gains and inertia ratios of the other axes included in the relevant axes may be set at the same values. In addition, when an inertia ratio is estimated, its validity may be determined.

As in FIG. 4, the driver communication units 54 and 64 may communicate through the signal relay unit 71 in the controller 7.

Modifications

Figure 12:
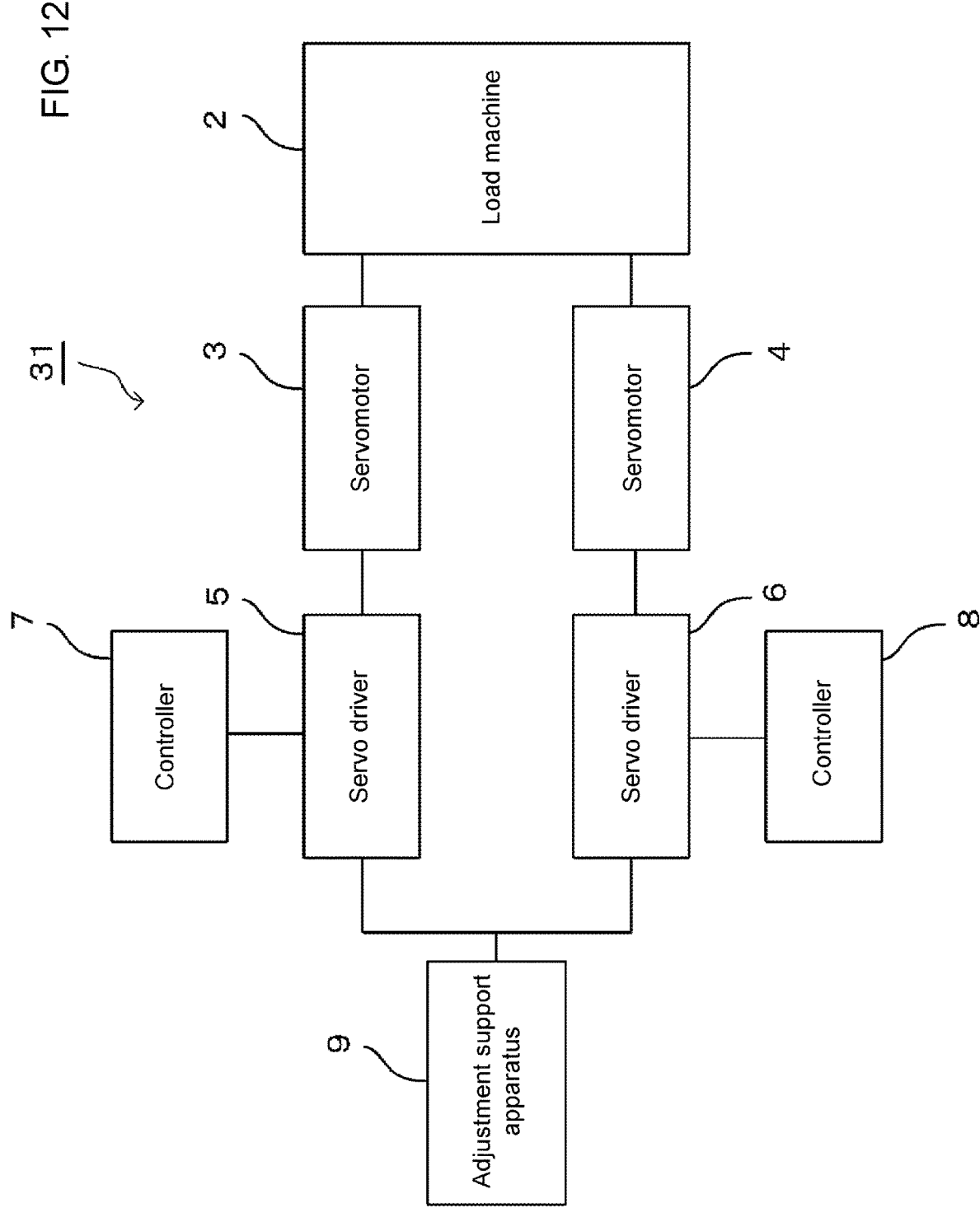
FIG. 12 is a schematic block diagram of a control system according to a modification of the first embodiment.

In the control system 1 according to the first embodiment, the adjustment support apparatus 9 is connected to the servo drivers 5 and 6 through the controller 7 for the servo drivers 5 and 6. However, the control system is not limited to this configuration. FIG. 12 shows the configuration of a control system 31 according to a modification of the first embodiment. In the control system 31, the servo driver 5 is controlled by a controller 7, and the servo driver 6 is controlled by a controller 8. The adjustment support apparatus 9 is connected to the servo drivers 5 and 6 without the controllers 7 and 8 in between. The configurations and the operations of the servo drivers 5 and 6 and the adjustment support apparatus 9 are the same as in the control system 1 shown in FIG. 4 except for the absence of the signal relay by the signal relay unit 71 in the controller 7 and will not be described in detail.

Figure 13:
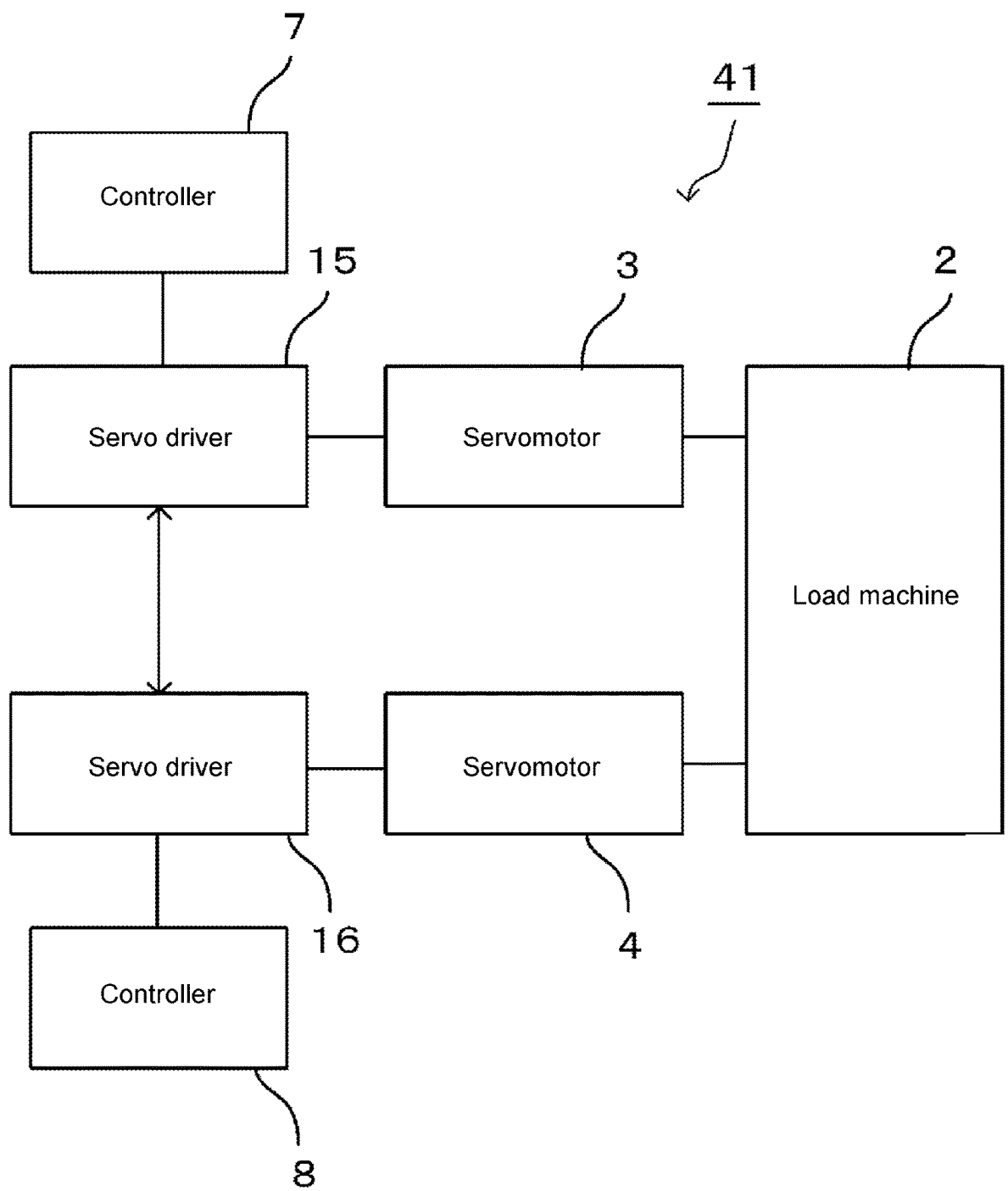
FIG. 13 is a schematic block diagram of a control system according to a modification of the fourth embodiment.

In the control system 11 according to the fourth embodiment, the adjustment support apparatus 9 is connected to the servo drivers 5 and 6 through the controller 7 for the servo drivers 5 and 6. However, the control system is not limited to this configuration. FIG. 13 shows the configuration of a control system 41 according to a modification of the fourth embodiment. In the control system 41, the servo driver 5 is controlled by a controller 7, and the servo driver 6 is controlled by a controller 8. The configuration and the operation of the servo drivers 5 and 6 are the same as in the control system 11 shown in FIG. 10 and will not be described in detail.

The elements in the aspects of the present invention below are identified with reference numerals used in the drawings to show the correspondence between these elements and the components in the embodiments.

Aspect 1

An adjustment support apparatus (9) for supporting adjustment of control parameters for a plurality of servomotors (3, 4), the apparatus (9) comprising:

a parameter obtainer (91) configured to obtain a parameter including an estimated inertia ratio for a load drivable by the plurality of servomotors (3, 4); and a parameter setting controller (92) configured to allow setting of a parameter including an inertia ratio for controlling the plurality of servomotors, wherein after the parameter obtainer (91) obtains the estimated inertia ratio for each of the plurality of servomotors (3, 4), the parameter setting controller (92) allows the obtained inertia ratio to be set for each of the plurality of servomotors (3, 4).

Aspect 2

A servo driver (15, 16) for controlling a servomotor (3, 4) included in a plurality of servomotors (3, 4), the servo driver (15, 16) comprising:

a control unit (51, 61) configured to control the servomotor (3, 4);

a parameter estimator (52, 62) configured to estimate a parameter including an inertia ratio for a load drivable by the servomotor (3, 4); and a setting synchronization configured to synchronize setting of the estimated parameter in the control unit (51, 61) with setting of an estimated parameter in a control unit (51, 61) included in a servo driver (15, 16) for controlling another servomotor (3, 4) in the plurality of servomotors (3, 4).

Aspect 3

A control parameter adjustment method for a plurality of servomotors (3, 4), the method comprising:

obtaining, for each of the plurality of servomotors, a control parameter including an estimated inertia ratio for a load drivable by the plurality of servomotors (3, 4); and setting the obtained control parameter as a control parameter for controlling each of the plurality of servomotors.

Aspect 4

A control parameter adjustment method for a plurality of servomotors (3, 4), the method comprising:

estimating, with each of the plurality of servomotors (3, 4), a control parameter including an inertia ratio for a load drivable by the plurality of servomotors (3, 4); and setting, with each of the plurality of servomotors (3, 4), the estimated control parameter as a control parameter for controlling each of the plurality of servomotors after all the servomotors of the plurality of servomotors (3, 4) perform the control parameter estimation.

Aspect 5

A program for adjusting control parameters for a plurality of servomotors (3, 4), the program causing a computer to perform operations comprising:

obtaining, for each of the plurality of servomotors (3, 4), a control parameter including an estimated inertia ratio for a load drivable by the plurality of servomotors (3, 4); and setting the obtained control parameter as a control parameter for controlling each of the plurality of servomotors (3, 4).

Aspect 6

A program for adjusting control parameters for a plurality of servomotors (3, 4), the program causing a computer to perform operations comprising:

estimating, with each of the plurality of servomotors (3, 4), a control parameter including an inertia ratio for a load drivable by the plurality of servomotor (3, 4); and setting, with each of the plurality of servomotors (3, 4), the estimated control parameter as a control parameter for controlling each of the plurality of servomotors (3, 4) after all the servomotors of the plurality of servomotors (3, 4) perform the control parameter estimation.

DESCRIPTION OF SYMBOLS 3, 4 servomotor, 9 adjustment support apparatus, 15, 16 servo driver, 21 first axis, 22 second axis, 23 machine element, 55, 56 setting synchronization unit, 91 inertia ratio obtainer, 92 inertia ratio setting control unit, 93 validity determination unit

The invention claimed is:

1. An adjustment support apparatus for supporting adjustment of control parameters for a plurality of servomotors, the apparatus comprising:

a parameter obtainer configured to obtain a parameter including an estimated inertia ratio for a load drivable by the plurality of servomotors; and a parameter setting controller configured to allow setting of a parameter including an inertia ratio for controlling the plurality of servomotors, wherein when an inertia ratio for one of the plurality of servomotors is estimated, the parameter setting controller allows gains and inertia ratios of the other servomotors of the plurality of servomotors to be set at an identical gain and an identical inertia ratio, and after the parameter obtainer obtains the estimated inertia ratio for each of the plurality of servomotors, the parameter setting controller allows the obtained inertia ratio to be set for each of the plurality of servomotors.

2. The adjustment support apparatus according to claim 1, further comprising:
a validity determination unit configured to determine validity of the estimated inertia ratio obtained by the parameter obtainer,
wherein after the parameter obtainer obtains the estimated and determined-to-be-valid inertia ratio for each of the plurality of servomotors, the parameter setting controller allows the obtained inertia ratio to be set for each of the plurality of servomotors.

3. The adjustment support apparatus according to claim 1, wherein
the plurality of servomotors drive a load including axes with possible axis interference with each other.

4. A servo driver for controlling a servomotor included in a plurality of servomotors, the servo driver comprising:
a control unit configured to control the servomotor;
a parameter estimator configured to estimate a parameter including an inertia ratio for a load drivable by the servomotor; and
a setting synchronization unit configured to synchronize setting of the estimated parameter in the control unit with setting of an estimated parameter in a control unit included in a servo driver for controlling another servomotor included in the plurality of servomotors,
wherein when an inertia ratio for one of the plurality of servomotors is estimated, the setting synchronization unit allows gains and inertia ratios of the other servomotors of the plurality of servomotors to be set at an identical gain and an identical inertia ratio.

5. The servo driver according to claim 4, wherein
the plurality of servomotors drive a load including axes with possible axis interference with each other.

6. The servo driver according to claim 4, further comprising:
a validity determination unit configured to determine validity of the estimated inertia ratio estimated by the parameter estimator,
wherein the setting synchronization unit allows the estimated and determined-to-be-valid inertia ratio to be set for each of the plurality of servomotors.

7. A control parameter adjustment method for a plurality of servomotors, the method comprising:
setting, when an inertia ratio for one of the plurality of servomotors is estimated, gains and inertia ratios of the other servomotors of the plurality of servomotors at an identical gain and an identical inertia ratio;
obtaining, for each of the plurality of servomotors, a control parameter including an estimated inertia ratio for a load drivable by the plurality of servomotors; and
setting the obtained control parameter as a control parameter for controlling each of the plurality of servomotors.

8. The control parameter adjustment method according to claim 7, further comprising:
determining whether the control parameter obtained from each of the plurality of servomotors is valid,
wherein the control parameter determined to be valid is set as a control parameter for controlling each of the plurality of servomotors.

9. The control parameter adjustment method according to claim 7, wherein
the plurality of servomotors drive a load including axes with possible axis interference with each other.

10. A control parameter adjustment method for a plurality of servomotors, the method comprising:
setting, when an inertia ratio for one of the plurality of servomotors is estimated, gains and inertia ratios of the other servomotors of the plurality of servomotors at an identical gain and an identical inertia ratio;
estimating, with each of the plurality of servomotors, a control parameter including an inertia ratio for a load drivable by the plurality of servomotors; and
setting, with each of the plurality of servomotors, the estimated control parameter as a control parameter for controlling each of the plurality of servomotors after all the servomotors of the plurality of servomotors perform the control parameter estimation.

11. The control parameter adjustment method according to claim 10, wherein
the plurality of servomotors drive a load including axes with possible axis interference with each other.

12. The control parameter adjustment method according to claim 10, further comprising:
determining whether the control parameter obtained from each of the plurality of servomotors is valid; and
setting, with each of the plurality of servomotors, the estimated and determined-to-be-valid control parameter as a control parameter for controlling each of the plurality of servomotors after all the servomotors of the plurality of servomotors perform the control parameter estimation and determination.

13. A non-transitory computer readable medium storing a program for adjusting control parameters for a plurality of servomotors, the program causing a computer to perform operations comprising:
setting, when an inertia ratio for one of the plurality of servomotors is estimated, gains and inertia ratios of the other servomotors of the plurality of servomotors at an identical gain and an identical inertia ratio;
obtaining, for each of the plurality of servomotors, a control parameter including an estimated inertia ratio for a load drivable by the plurality of servomotors; and
setting the obtained control parameter as a control parameter for controlling each of the plurality of servomotors.

14. The non-transitory computer readable medium according to claim 13, wherein the program causes the computer to perform further operations comprising:
determining whether the control parameter obtained from each of the plurality of servomotors is valid,
wherein the control parameter determined to be valid is set as a control parameter for controlling each of the plurality of servomotors.

15. A non-transitory computer readable medium storing a program for adjusting control parameters for a plurality of servomotors, the program causing a computer to perform operations comprising:
setting, when an inertia ratio for one of the plurality of servomotors is estimated, gains and inertia ratios of the other servomotors of the plurality of servomotors at an identical gain and an identical inertia ratio;
estimating, with each of the plurality of servomotors, a control parameter including an inertia ratio for a load drivable by the plurality of servomotors; and
setting, with each of the plurality of servomotors, the estimated control parameter as a control parameter for controlling each of the plurality of servomotors after all the servomotors of the plurality of servomotors perform the control parameter estimation.

16. The non-transitory computer readable medium according to claim 15, wherein the program causes the computer to perform further operations comprising:
- determining whether the control parameter obtained from each of the plurality of servomotors is valid; and
- setting, with each of the plurality of servomotors, the estimated and determined-to-be-valid control parameter as a control parameter for controlling each of the plurality of servomotors after all the servomotors of the plurality of servomotors perform the control parameter estimation and determination.

* * * * *